United States Patent
Hancock et al.

(10) Patent No.: US 7,737,984 B2
(45) Date of Patent: Jun. 15, 2010

(54) METHOD AND SYSTEM FOR AN EXTERNAL FRONT BUFFER FOR A GRAPHICAL SYSTEM

(75) Inventors: William R. Hancock, Phoenix, AZ (US); Robert J. Quirk, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 441 days.

(21) Appl. No.: 11/479,813

(22) Filed: Jun. 30, 2006

(65) Prior Publication Data

US 2008/0001957 A1    Jan. 3, 2008

(51) Int. Cl.
G06T 1/60 (2006.01)
G06F 13/00 (2006.01)
G06G 5/399 (2006.01)
G06F 15/167 (2006.01)
G09G 5/36 (2006.01)

(52) U.S. Cl. ............ 345/530; 345/538; 345/539; 345/541; 345/545

(58) Field of Classification Search .......... 345/538, 345/539, 541, 545
See application file for complete search history.

(56) References Cited

U.S. PATENT DOCUMENTS

| | | | |
|---|---|---|---|
| 5,507,026 A * | 4/1996 | Fukushima et al. | 345/568 |
| 5,511,165 A * | 4/1996 | Brady et al. | 709/216 |
| 5,623,583 A * | 4/1997 | Nishino | 345/420 |
| 5,712,970 A * | 1/1998 | Arnott et al. | 714/6 |
| 5,896,492 A * | 4/1999 | Chong, Jr. | 714/3 |
| 5,969,711 A * | 10/1999 | Menzel | 345/179 |
| 6,094,203 A * | 7/2000 | Desormeaux | 345/501 |
| 6,348,921 B1 * | 2/2002 | Zhao et al. | 345/428 |
| 6,359,624 B1 | 3/2002 | Kunimatsu | |
| 2001/0004760 A1 * | 6/2001 | Im | 714/732 |
| 2001/0048762 A1 * | 12/2001 | Matsuura et al. | 382/154 |
| 2002/0135585 A1 * | 9/2002 | Dye et al. | 345/531 |

(Continued)

OTHER PUBLICATIONS

European Search Report for Application No. EP 07111271, mailed on Feb. 25, 2009.

*Primary Examiner*—Xiao M Wu
*Assistant Examiner*—David T Welch
(74) *Attorney, Agent, or Firm*—Ingrassia Fisher & Lorenz, P.C.

(57) ABSTRACT

In one embodiment of the present invention, a system for displaying images in at least one display window on a display unit includes a display processor configured to generate graphics commands from a received input. A graphics processing unit is coupled to the display processor and includes rendering engine configured to generate graphic data from the graphics commands, an internal memory coupled to the rendering engine, and a general purpose I/O coupled to the rendering engine and configured to transmit messages from the graphics processing unit. A graphics logic device is coupled to the graphics processing unit. The graphics logic device is configured to initiate a transfer of graphic data for an update of a display window from the internal memory to the display unit upon receipt of a message indicative of an available update to the display window. An external memory is coupled to the graphics logic device and the external memory is configured to supply graphic data to the display window when the update of the display unit is not available and to store the update of the display window when the display window receives the update from the internal memory.

14 Claims, 2 Drawing Sheets

U.S. PATENT DOCUMENTS

| | | | |
|---|---|---|---|
| 2003/0140179 A1* | 7/2003 | Wilt et al. | 709/321 |
| 2003/0169269 A1 | 9/2003 | Sasaki et al. | |
| 2004/0150647 A1* | 8/2004 | Aleksic et al. | 345/555 |
| 2005/0225556 A1* | 10/2005 | Booth | 345/537 |
| 2006/0177119 A1* | 8/2006 | McPheely et al. | 382/141 |
| 2007/0046680 A1* | 3/2007 | Hedrick et al. | 345/503 |

\* cited by examiner

METHOD AND SYSTEM FOR AN EXTERNAL FRONT BUFFER FOR A GRAPHICAL SYSTEM

FIELD OF THE INVENTION

The present invention relates to the field of display units, and more specifically to a method and system for an external front buffer for a graphical system.

BACKGROUND OF THE INVENTION

Display units are widely used to display textual and graphic data to operators of complex systems such as aircraft. In order to display images on a display unit, in a typical embodiment, a "ping-pong" buffer memory is used by a graphics processing unit. When the graphics processing unit updates the image in the "ping" buffer, the "pong" buffer supplies the last completed image to the display unit. Once the image in the "ping" buffer is fully updated, the "pong" buffer swaps with the "ping" buffer and the "ping" buffer supplies the image to the display unit while the "pong" buffer is updated by the graphics processing unit.

This method becomes more difficult to accomplish when multiple graphical display units need to be supported by the same graphics processing unit. For example, if a graphics processing unit supports two display units instead of one display unit, roughly twice as much memory is required. Additionally, complexity arises if the graphics processing units need to support multiple display windows with different display rates displayed on a single display unit. In order to support multiple display windows, the data for each display window is copied from a back "ping" buffer to a front buffer which introduces delays rendering images as well as synchronization problems compared with the normal "ping/pong" embodiment.

Accordingly, it is desired to provide a method and system for an external front buffer for a graphical system. Furthermore, the desirable features and characteristics of the present invention will be apparent from the subsequent detailed description and the appended claims, taken in conjunction with the accompanying drawings and the foregoing technical field and background.

BRIEF SUMMARY OF THE INVENTION

In one embodiment of the present invention, a system for displaying images in at least one display window on a display unit includes a display processor configured to generate graphics commands from a received input. A graphics processing unit is coupled to the display processor and includes rendering engine configured to generate graphic data from the graphics commands, an internal memory coupled to the rendering engine, and a general purpose I/O coupled to the rendering engine and configured to transmit messages from the graphics processing unit. A graphics logic device is coupled to the graphics processing unit. The graphics logic device is configured to initiate a transfer of graphic data for an update of a display window from the internal memory to the display unit upon receipt of a message indicative of an available update to the display window. An external memory is coupled to the graphics logic device and the external memory is configured to supply graphic data to the display window when the update of the display unit is not available and to store the update of the display window when the display window receives the update from the internal memory.

In another embodiment of the present invention, a method for displaying an image on a display unit comprising at least one display window includes a step of generating updated graphic data comprising an update to a display window of the display unit at a graphics processing unit. Next, the updated graphic data is stored to an internal memory of the graphics processing unit. A message indicative of a completion of the generation of the updated graphic data; is sent. A first transfer of the updated graphic data to the display window of the display unit is initiated and the updated graphic data is saved to an external memory upon receipt of the message at a graphics logic device. A second transfer of graphic data stored in the external memory to the display window of the display unit is initiated if the message has not been received at the graphics logic device.

In another embodiment of the present invention, a graphical system for displaying an image on a display unit comprising a graphics logic device and an external memory coupled to the graphics logic device. The graphics logic device is configured to initiate a transfer of updated graphic data to the display unit upon receipt of a transfer signal. The external memory is configured to store the updated graphic data as the updated graphic data is transferred to the display unit.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
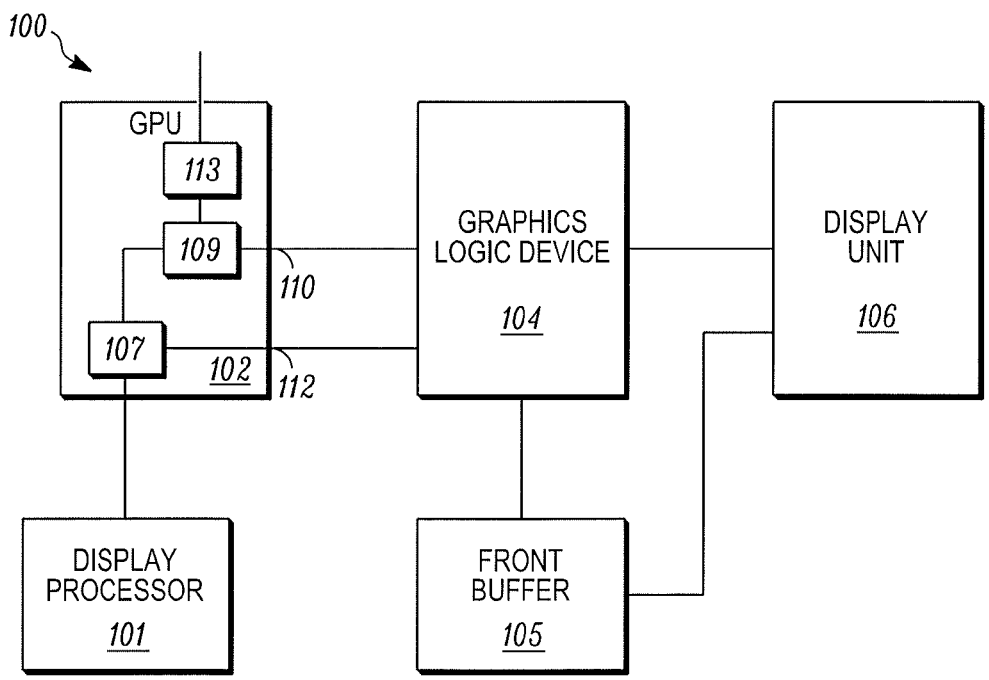
FIG. 1 is a block diagram of an exemplary embodiment of a graphical display system in accordance with the teachings of the present invention.

FIG. 1 illustrates an exemplary embodiment of a graphical display system 100 in accordance with the teachings of the present invention. The graphical display system 100 includes one or more display processors 101 coupled to one or more graphics processing units (GPU) 102, each of which is coupled to one or more graphics logic devices 104. Each of the graphics logic devices 104 is coupled to a front buffer 105 and to one or more display units 106.

Display processor 101 receives data from other systems to generate graphics commands for the GPU 102. The display processor 101 typically generates data in world coordinates, which are Cartesian coordinates using actual measurement units, as opposed to pixel coordinates, which are used as a coordinate system referenced to the display unit 106. In one embodiment, the input to the display processor 101 can be data such as a commanded change in an aircraft's pitch or roll. This data can then be used to generate commands for the GPU 102. A myriad of other system data can also be supplied to the display processor 101.

GPU 102 can be any processing device capable of receiving data and graphics commands and rendering graphic data to form an image for display on the display unit 106. For example, data regarding the banking angle of an aircraft can be received by the GPU 102. The received data and graphics commands can then be rendered to form graphic data which can be used by the display unit 106 to form an image that graphically represents the banking angle. GPU 102 can include a rendering engine 109, an internal memory 107, a general purpose I/O 110, an optional video input 113, and a pixel bus 112. GPU 102 can be a proprietary graphics processing unit, or, in one exemplary embodiment, GPU 102 can be a commercially available graphics processing unit.

Rendering engine 109 generates graphic data from received data and can provide other processing functions. A typical rendering engine 109 for a GPU 102 can perform various calculations related to the generation of images for display unit 106.

Internal memory 107 stores the rendered graphic data generated by the rendering engine 109 from the data received by the GPU 102. Typically, the internal memory 107 has a maximum size that can be populated.

General purpose I/O 110 can be any device that provides a communication link between the GPU 102 and the graphics logic device 104. In an exemplary embodiment, general purpose I/O 110 sends information to the graphics logic device 104 that indicates an update to an image, or part of an image such as an update of a display window of an image comprised of multiple display windows, has been rendered and is ready to be sent to the display unit 106.

Pixel bus 112 couples the GPU 102 and the graphics logic device 104 for the transfer of the rendered graphic data, in the form of pixels, to the graphics logic device 104. In one exemplary embodiment, data is sent over the pixel bus 112 in a transition minimized differential signaling (TMDS) format or a low voltage differential signaling (LVDS) format. An optional video input 113 allows for video, such as video generated by cameras mounted on an aircraft to monitor aircraft components to be inputted, into the GPU 102 for display on display unit 106. Video input 113 can include a video memory (typically part of internal memory 107) where the video can be received and the symbology overlaid with the video.

Graphics logic device 104 allows graphic data to be sent to the display 106 from either the internal memory 107 or the front buffer 105 based on, in one embodiment, the receipt of a message over the general purpose I/O 110. Graphics logic device 104 can also provide additional functionality such as ensuring the accuracy of generated graphic data. The graphics logic device 104 couples to the GPU 102 via the pixel bus 112 and the general purpose I/O 110. In one exemplary embodiment, graphics logic device 104 can be implemented as a field programmable gate array (FPGA). However, other ways of implementing the graphics logic device 104, such as the use of a processor, an application specific integrated circuit (ASIC) and the like, are within the scope of the present invention.

Graphics logic device 104, after receipt of a message indicative of the generation of an update to a display window of display unit 106, can send graphic data to the display unit 106 to update the display window. The graphics logic device 104, as it updates the display window of display unit 106, sends graphic data to the front buffer 105. When a display window is not being updated, the graphics logic device 104 can send the graphic data stored in the front buffer 105 to the display unit 106 for display. In one exemplary embodiment, the logic to accomplish this is replicated for each possible display window in the display unit, while the logic is provided as software, hardware logic or both. In one embodiment, graphics logic device 104 can support up to sixteen windows, and therefore has sixteen copies of the logic to handle the graphic data. The actual number of copies of the logic used depends on the actual number of display windows displayed on the display unit.

Front buffer 105 provides storage for graphic data representing the last completed images generated by the GPU 102 for presentation to the display unit 106. In one exemplary embodiment of the present invention, front buffer 105 provides at least some of the graphic data needed to display images on the display unit 106 when the GPU 102 is generating updates to the images displayed on the display unit 106. For example, graphic data stored in the front buffer 105 can be supplied to the display unit 106 from the front buffer 105 while the GPU 102 generates new graphic data. When a new image or update to a display window is finished by the GPU 102, the GPU 102 can supply that graphic data to the display unit 106 from the GPU's 102 internal memory 107. At the same time graphic data for the new image or new display window can be stored in the front buffer 105, which can then be used to update the display unit 106 until the GPU 102 is ready to send more graphic data. Once the internal memory 107 is copied to the front buffer 105, the GPU 102 is notified that the buffer swap has occurred. GPU 102 can then initiate the rendering of a new graphic update. In one exemplary embodiment, synchronous zero bus turnaround RAM devices can be used for the front buffer 105. Other memory devices can also be used for the present invention.

Additionally, since the use of the front buffer 105 can reduce the storage requirements for the internal memory 107, allowing parts of the internal memory 107 to be utilized for other purpose, such as storing texture maps for character and symbology generation.

Display unit 106 displays the images generated by the GPU 102. Display unit 106, in one exemplary embodiment, is a liquid crystal display (LCD), although other display technologies such as cathode ray tube (CRT) displays, organic light emitting diode (OLED) displays, and plasma displays can also be used.

Figure 2:
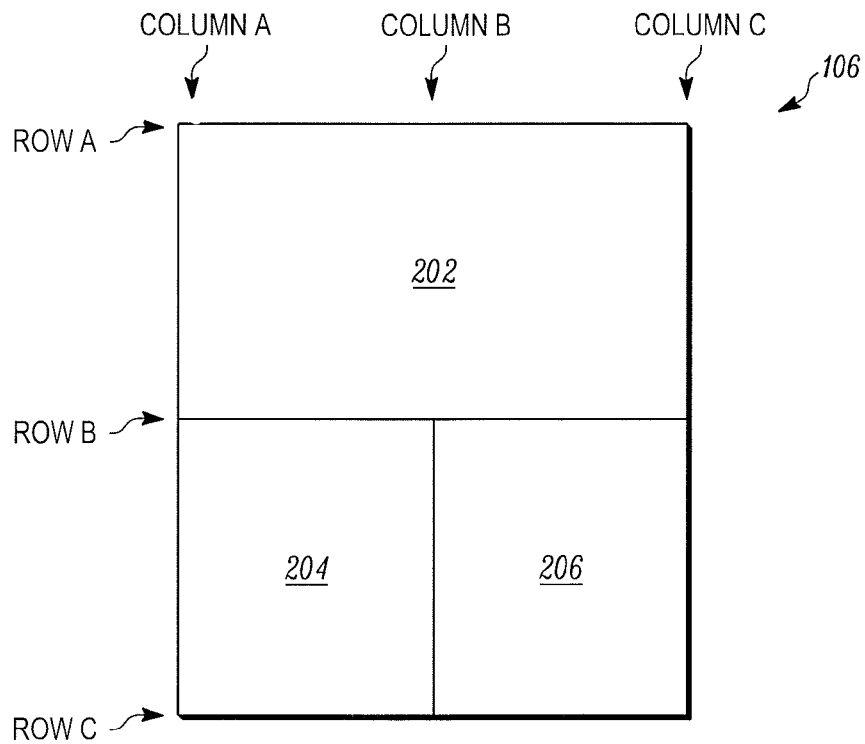
FIG. 2 illustrates an exemplary embodiment of a display unit with multiple display windows in accordance with the teachings of the present invention.

In one exemplary embodiment, each display unit 106 can display a plurality of different display windows with each display window updated at a different rate. For example, FIG. 2 illustrates an image that is displayed on display unit 106 that is comprised of three different display windows 202-206. Each different display window 202-206 can display different information such as altimeter information, weather information, plane banking angle information, and the like.

First display window 202, in this exemplary embodiment, updates at a 20 Hz rate or once every 50 msec. Second display window 204 updates at a 10 Hz rate or once every 100 msec and third display window updates at a 5 Hz rate or once every 200 msec. In this exemplary embodiment, the display unit 106 refresh rate is 60 Hz or once every 16.7 msec. In embodiments where multiple display windows are displayed on the display unit 106, the GPU 102 can send graphic data for each display window, with the buffer swap scheduled for one or more windows at a time. The GPU 102 can independently determine the update rate for each display window 202-206.

In one exemplary embodiment, the graphics logic device 104 stores information regarding the location of the display windows 202-206 of the display unit 106. This information can be used to determine when individual pixels on the pixel bus are inside a particular display window, thus controlling when an update should be provided by the internal memory 107. As seen in FIG. 2, the first display window 202 is defined between column A and column C and row A and row B. The second display window 204 is defined between column A and column B and row B and row C. The third display window is defined between column B and column C and row B and row C.

Figure 3:
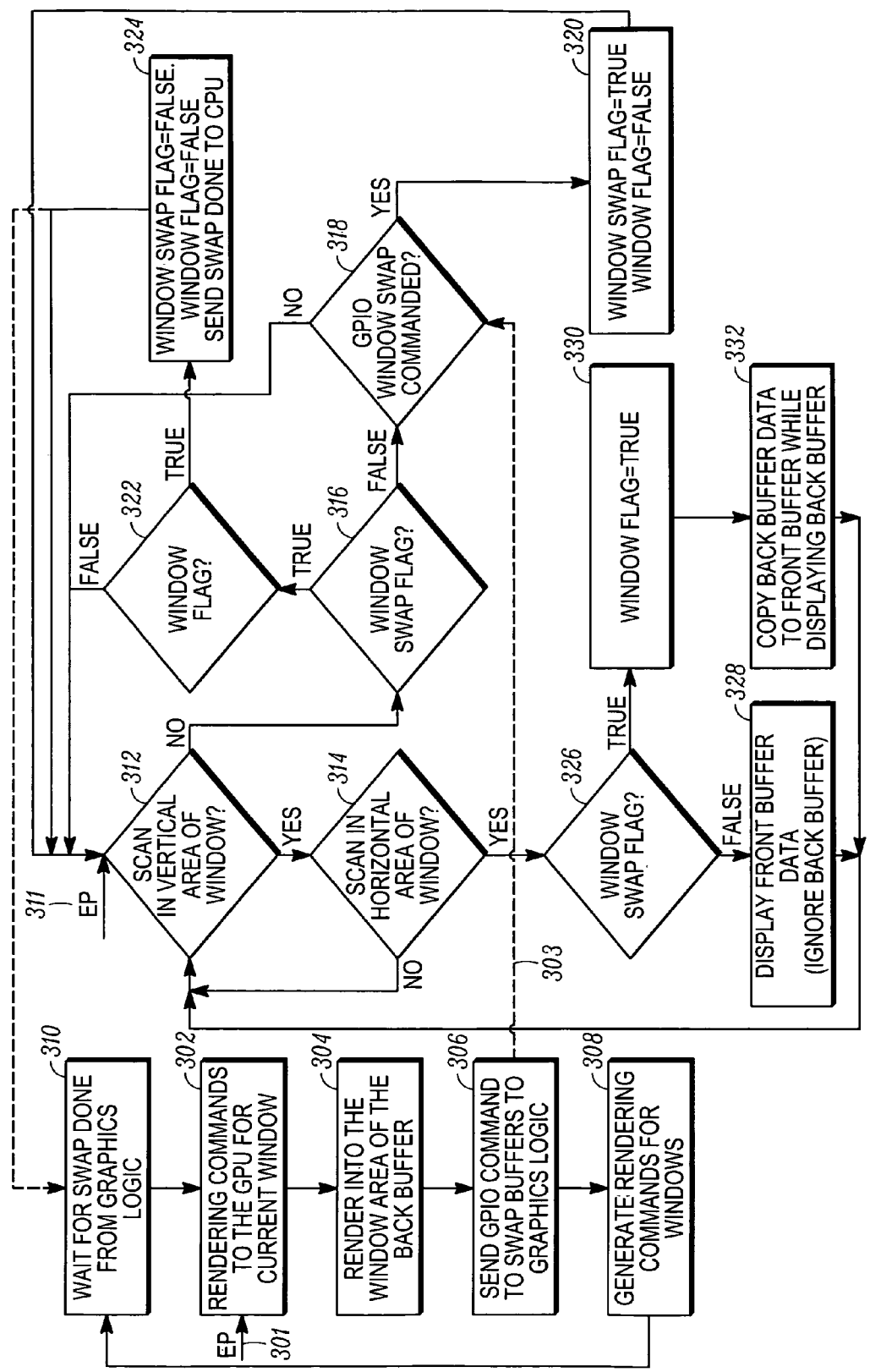
FIG. 3 is a flowchart of an exemplary embodiment of a method to display graphic data in accordance with the teachings of the present invention.

FIG. 3 is a flowchart illustrating an exemplary embodiment of a method to display graphic data in accordance with the teachings of the present invention. In the method of FIG. 3, multiple simultaneous operations are outlined. Steps 302-310 occur at either the GPU 102 or the display processor 101 and steps 312-332 occur at the graphics logic device 104. The actions outlined in these sets of steps can occur simultaneously. FIG. 3 has two starting points, a first entry point 301 at the GPU 102 and a second entry point 311 at the graphics logic device 104. In an exemplary embodiment of the present invention the display windows are processed in parallel, wherein multiple windows are processed with each following their own version of FIG. 3. The logic in this flowchart is functionally replicated for each active window resulting in additional parallelism. This parallelism is necessarily constrained by the availability of the display processor 101 and GPU 102 resources on the left side of FIG. 3 (steps 302-310), but is fully parallel in the right side of the diagram (steps 312-332 in the graphics logic device 104). In an alternative embodiment, additional display processors 101 and GPUs 102 can be provided to increase the availability of the display processors 101 and the GPUs 102.

Turning first to first entry point 301, at first step 302. In step 302, the GPU 102 receives rendering commands from the display processor 101 for the current display window of the display unit 106. Next, in step 304, the GPU 102 renders the graphics commands to form the graphic data for that display window of the display unit 106 and stores the graphic data to the internal memory 107. In an exemplary embodiment, the display windows are rendered effectively in parallel or piecemeal parallel, starting with the display window having the highest update rate. In the exemplary embodiment of FIG. 2, the first display window 202 will be rendered first and the rendered graphical data for the first display window 202 can be stored in the internal memory 107 of the GPU 102 as the graphical data is generated. Updates to the second display window 204 and the third display window 206 will then be generated. Because the update rate of the first display window 202 is twice that of the second display window 204 and four times the update rate of the third display window 206, updates to the first display window 202 will occur more frequently.

Next, in step 306, a message is sent over the general purpose I/O 110 indicating that one display window is ready for display and the internal memory 107 can be copied (swapped) to the front buffer 105. Note, that in FIG. 3, first data flow line 303 represents the flow of data between the general purpose I/O 110 of the GPU 102 and the graphics logic device 104. This message is used to set a swap flag at step 320. Each window has it own copy of this logic and associated swap flags.

In step 308, additional rendering commands are generated by the display processor 101. Step 308 can occur simultaneously with the rendering of graphic data at step 304 and the operating of the graphics logic device 104 as outlined in steps 312-332 of FIG. 3. This processing and rendering can be performed for any window following the logic of the flowchart of FIG. 3, given the limitation on the number of processing elements (i.e., the display processor 101 and the GPU 102).

After the commands are generated in step 308, the display processor 101 waits in step 310 until a message is sent from the graphics logic device 104 to the display processor 101 indicating that internal memory 107 associated with the corresponding display window has been copied to the front buffer 105. After this occurs, this part of the method returns to step 302 where the display processor 101 transmits the graphics commands to the GPU 102. The process continues from there. Note that since the display windows, in an exemplary embodiment, are processed in parallel, while this process for one display window waits to exit step 310, other display windows can be in any of the other steps of this process, including step 310. Thus, one display window can be waiting for the message of step 310, while the GPU 102 is rendering the graphics commands for another display window, and another display window can be updated from the internal memory 107. Thus, instead of the display processor 101 or GPU 102 waiting for a buffer swap before proceeding, in an exemplary embodiment of the present invention, the parallelism for window processing achieves an efficient gain. Each display window will have a unique code that is returned from step 324 in order for the display processor 101 to distinguish which display window has been completed and is ready for new commands to be generated.

Turning now to steps 312-332, this part of the method begins at second entry point 311. At step 312, it is determined if the current scan position for the display is in a vertical area of a window. In an exemplary embodiment of the present invention, the display unit 106 is drawn by scanning from left to right, and top to bottom, setting the pixel state of the display unit 106 as the scan progresses. That is, the scan starts at the first pixel of the first row and first column and then scans left to right across the columns in the first row. In step 312, the current scan position is in the vertical area of one of the windows if the current row is within the rows encompassed by the display window. Note that if there is only one display window for the display unit 106, then steps 312 and 314 can be eliminated and replaced with a check for a vertical blanking period, because the scan will always be within the vertical and horizontal area of the one window and the buffer swap will always be initiated during vertical blank. The vertical blanking period occurs when the scan is within a non-displayed portion of the display unit 106.

For example, second display window 204 is defined by column A, column B, row B and row C. When scanning left to right and top to bottom, the scan is initially outside the vertical area of the second display window 204, between row A and row B. When in this area of the display unit 106, the scan is not in the vertical area, so step 312 evaluates as a no.

In step 314, it is determined if the scan is in the horizontal area of the display window. In the example of FIG. 2, when the scan is between the column A and column B, for rows B though C the scan is inside the second display window 204. If the scan is not in the horizontal area, the method then returns to step 312.

If, in step 312, the scan is not in the vertical area of the display window, such as when the scan area is between row A and row B or in the vertical blanking period, then the method continues at step 316 where it is determined if a window swap flag is set. The window swap flag indicates that graphic data for a display window has been generated at the GPU 102 and the graphic data in the internal memory 107 is ready to be swapped to the front buffer 105 and displayed in the display window.

If the window swap flag is not set, in step 318 it is determined if the command from the general purpose I/O 110 to the GPU 102 indicating a completed display window is ready has been sent (see step 306). If the window swap command has not been received, the method returns to step 312.

If the window swap command has been received, in step 320, the window swap command is set to true and the window flag, which represents that a window swap has occurred, is set to false. The method then returns to step 312.

If, in step 316, a window swap flag had been set, the method continues to step 322, where it is determined if a window flag has been set. If a window flag has not been set, the method continues in step 312.

If the window flag has been set, indicating the graphic data in the internal memory 107 has been sent to the front buffer 105 and the display unit 106, then, following step 316, in step 324 the window swap flag is set to false and the window flag is set to false. A message indicating the swap of this window has been completed is then sent to the display processor 101. Recall that in step 310, the display processor 101 waits until the swap done message before transmitting rendering commands in step 302.

Turning back to step 314, if the scan is within the vertical area of the window, then the method continues in step 326. With reference to the second display window 240 in FIG. 2, if step 314 is true, the scan is between column A, through B and row B through row C.

In step 326, it is determined if the window swap flag is set. If the window swap flag is not set to true, the front buffer 105 sends graphic data to the display unit 106 for the display window in step 328. The process then continues at step 312.

If, in step 326, the window swap flag is set to true, the process then continues at step 330. In step 330, the window flag is set to true indicating that the internal memory 107 to front buffer 105 transfer is in progress. Then, in step 332, the graphic data from the internal memory 107 is sent to the front buffer 105 and the graphic data from the internal memory 107 is also sent to the display unit 106 for display. Thus, the graphic logic device controls the update of the display window and the sending of graphic data to the external memory. In one exemplary embodiment, the pixels are sent to the display unit 106 for display at the same time they are sent to the external memory. Although simultaneous transfer of graphic data is typically done in an embodiment of the present invention, non-simultaneous transfer of graphic date is also within the scope of the present invention.

While this method of FIG. 3 is executed for a single display window, such as the second display window 204, other instances of the logic are operating for the first display window 202 and the third display window 206.

In another embodiment, video images are also displayed on the display unit 106. In this embodiment, video images are received at the GPU 102 via the optional video input 113. As discussed previously, the video can be supplied from sources such as cameras mounted on an aircraft fuselage to monitor landing gear position. In one exemplary embodiment of the present invention, the video is merged with any textual or graphical information at the GPU 102. A message is sent over the general purpose I/O 110 that a video window is ready to be updated so that the front buffer 105 can be used to refresh the display window of the display unit 106. When the video window is sent, it is sent directly from the internal memory 107. The video window can be sent directly from the internal memory 107 because the amount of symbology or graphic elements that need to be generated for display with a video tends to be small and little time is needed for rendering. Additionally, the update rates of the overlaid symbology tend to be low. For displaying video windows, the buffer swap logic is reversed, such that buffer swapping to the front buffer 105 occurs normally and refresh from the front buffer 105 only occurs during symbology generation. This optional mode maximizes the video update rate for the case where the video is being updated from a video overlay function in the GPU 102 at a high rate such as 60 Hertz, which is merged with the symbology just before being transmitted over the pixel bus 112.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A system for displaying images in at least one display window on a display unit, comprising:
    a display processor configured to generate graphics commands from a received input;
    a graphics processing unit coupled to the display processor and configured to generate graphic data from the graphics commands, the graphics processing unit comprising:
        a rendering engine;
        an internal memory coupled to the rendering engine; and
        a general purpose I/O coupled to the rendering engine and configured to transmit messages from the graphics processing unit;
    a graphics logic device coupled to the graphics processing unit and directly connected to the display unit, the graphics logic device configured to initiate a transfer of the graphic data for display in a display window from the internal memory to the display unit upon receipt of a message indicative of the graphic data being available; and
    an external memory operably coupled between the graphics logic device and the display unit thereby providing a second coupling from the graphics logic device to the display unit, the external memory configured to receive a copy of the graphic data from the graphics logic device and to supply the copy of the graphic data to the display window when the message indicative of the graphic data being available is not received by the graphics logic device and to store a copy of the update of the graphic data for the display window as the display window receives the update of the graphic data from the internal memory directly from the graphics logic device.

2. The system of claim 1 wherein the graphics logic device includes logic to initiate the transfer of graphic data for the update and to save the graphic data to the external memory for each of the at least one display window.

3. The system of claim 1 wherein the graphics logic device is configured to initiate the transfer of graphic data for the update of the display window at the start of a vertical scan period.

4. The system of claim 1 wherein the graphics logic device is configured to initiate the transfer of graphic data for the update of at least one display window upon receipt of the message indicative of the available update if a scan of the display unit has not reached the display window.

5. The system of claim 1 wherein the graphics processing unit is further configured to receive video data supplied to the display unit from the internal memory.

6. The system of claim 4 wherein each display window of the one or more display windows are processed in parallel.

7. The system of claim 1 wherein a first display window has a first refresh rate and a second display window has a second refresh rate.

8. The system of claim 1 wherein the display unit is a display unit on an aircraft.

9. A method for displaying an image on a display unit comprising at least one display window, the method comprising the steps of:
   generating updated graphic data comprising an update to a display window of the display unit at a graphics processing unit;
   storing the updated graphic data to an internal memory of the graphics processing unit;
   sending a message indicative of a completion of the generation of the updated graphic data to a graphics logic device;
   initiating a first transfer of the updated graphic data from the graphics processing unit to the graphics logic device and then directly from the graphics logic device to the display window of the display unit by the graphics logic device while simultaneously saving the updated graphic data to an external memory from the graphics logic device upon receipt of the message at the graphics logic device, the external memory being operably coupled between the graphics logic device and the display unit thereby providing a second coupling from the graphics logic device to the display unit; and
   initiating a second transfer of graphic data previously stored in the external memory to the display window of the display unit if the message has not been received at the graphics logic device.

10. The method of claim 9 further comprising the step of sending graphic data to two or more display units.

11. The method of claim 9 wherein the step of initiating a first transfer of updated graphic data further comprises initiating a first transfer of updated graphic data when a scan of the display unit is within the display window corresponding to the updated graphic data and after receipt of the message.

12. The method of claim 9 wherein the step of initiating a first transfer of updated graphic data further comprises initiating a first transfer of updated graphic data upon receipt of the message and before the start of the vertical scan period if the external memory has not yet staffed to transfer graphic data to the display window associated with the updated graphic data.

13. The method of claim 9 further comprising the steps of:
   receiving video data into a separate video overlay memory area;
   merging the video data with other graphic data to generate video graphic data;
   transmitting the combined pixel data to the graphics logic device; and
   transferring the video graphic data from the internal memory to the display unit.

14. The method of claim 9 further comprising the step of processing each of the at least one display windows in parallel.

* * * * *

UNITED STATES PATENT AND TRADEMARK OFFICE
CERTIFICATE OF CORRECTION

| | | |
|---|---|---|
| PATENT NO. | : 7,737,984 B2 | Page 1 of 1 |
| APPLICATION NO. | : 11/479813 | |
| DATED | : June 15, 2010 | |
| INVENTOR(S) | : William R. Hancock et al. | |

It is certified that error appears in the above-identified patent and that said Letters Patent is hereby corrected as shown below:

Column 10, line 16, "staffed" should be changed to --started--.

Signed and Sealed this

Nineteenth Day of October, 2010

David J. Kappos
*Director of the United States Patent and Trademark Office*